US010056726B2

(12) United States Patent
Judkins et al.

(10) Patent No.: US 10,056,726 B2
(45) Date of Patent: Aug. 21, 2018

(54) POWER SUPPLY SYSTEM

(71) Applicant: MADE IN MIND LIMITED, London (GB)

(72) Inventors: Matthew Judkins, London (GB); Min-Kyu Choi, London (GB)

(73) Assignee: MADE IN MIND LIMITED, London (GB)

( * ) Notice: Subject to any disclaimer, the term of this patent is extended or adjusted under 35 U.S.C. 154(b) by 0 days.

(21) Appl. No.: 15/024,397

(22) PCT Filed: Sep. 24, 2014

(86) PCT No.: PCT/EP2014/070418
§ 371 (c)(1),
(2) Date: Mar. 24, 2016

(87) PCT Pub. No.: WO2015/044234
PCT Pub. Date: Apr. 2, 2015

(65) Prior Publication Data
US 2016/0268749 A1     Sep. 15, 2016

(30) Foreign Application Priority Data

Sep. 24, 2013 (GB) .................................. 1316969.3

(51) Int. Cl.
*H01R 13/00* (2006.01)
*H01R 31/06* (2006.01)
(Continued)

(52) U.S. Cl.
CPC ......... *H01R 31/065* (2013.01); *H01R 13/627* (2013.01); *H01R 13/6278* (2013.01);
(Continued)

(58) Field of Classification Search
CPC .................................................. H01R 31/065
See application file for complete search history.

(56) References Cited

U.S. PATENT DOCUMENTS

| 7,573,159 B1 * | 8/2009 | DeIuliis | ............... | H01R 31/065 307/150 |
| 2004/0085043 A1 * | 5/2004 | Germagian | ........... | H02M 7/003 320/107 |

(Continued)

FOREIGN PATENT DOCUMENTS

| DE | 10 2010 00352 | 10/2011 |
| EP | 1 221 745 | 7/2002 |

(Continued)

OTHER PUBLICATIONS

International Search Report for PCT/EP2014/070418, dated Feb. 23, 2015, 4 pages.

(Continued)

*Primary Examiner* — James Harvey
(74) *Attorney, Agent, or Firm* — Nixon & Vanderhye P.C.

(57) ABSTRACT

A power supply system 1 comprising: a device part 5 that is connectable to an electrical device for the supply of electrical power thereto, and a socket part 3 separate from said device part 5, the socket part 3 being for direct or indirect connection to a mains electrical socket; wherein the device part 5 and the socket part 3 are configured for electrical connection to one another so that electrical power can be transferred from said socket to said electrical device.

7 Claims, 5 Drawing Sheets

(51) Int. Cl.
*H01R 13/627* (2006.01)
*H01R 27/00* (2006.01)
*H02J 50/10* (2016.01)
*H01R 13/66* (2006.01)
*H01R 35/04* (2006.01)

(52) U.S. Cl.
CPC ......... *H01R 13/6675* (2013.01); *H01R 27/00* (2013.01); *H01R 31/06* (2013.01); *H01R 35/04* (2013.01); *H02J 50/10* (2016.02)

(56) References Cited

U.S. PATENT DOCUMENTS

| | | | | |
|---|---|---|---|---|
| 2004/0085694 | A1* | 5/2004 | Germagian | A45C 13/02 361/90 |
| 2010/0190381 | A1* | 7/2010 | Chatterjee | H01R 39/64 439/628 |
| 2011/0009003 | A1* | 1/2011 | Youssefi-Shams | H01R 13/44 439/628 |
| 2012/0058677 | A1* | 3/2012 | Choi | H01R 13/447 439/620.21 |
| 2012/0064772 | A1* | 3/2012 | Pocrass | H02J 7/0042 439/625 |
| 2013/0094154 | A1* | 4/2013 | Shen | H01R 13/502 361/731 |
| 2013/0300201 | A1* | 11/2013 | Wu | H01R 25/003 307/82 |
| 2014/0099808 | A1* | 4/2014 | McClelland | H01R 13/6205 439/153 |
| 2016/0268749 | A1* | 9/2016 | Judkins | H01R 13/6278 |

FOREIGN PATENT DOCUMENTS

| | | |
|---|---|---|
| GB | 2 467 644 | 8/2010 |
| JP | 10-208804 | 8/1998 |

OTHER PUBLICATIONS

Written Opinion of the ISA for PCT/EP2014/070418, dated Feb. 23, 2015, 6 pages.

* cited by examiner

POWER SUPPLY SYSTEM

This application is the U.S. national phase of International Application No. PCT/EP2014/070418 filed 24 Sep. 2014, which designated the U.S. and claims priority to GB Patent Application No. 1316969.3 filed 24 Sep. 2013, the entire contents of each of which are hereby incorporated by reference.

FIELD

This invention relates, in general terms, to a power supply system for routing electrical power directly or indirectly from a mains socket to an electrical device.

In one envisaged implementation the invention relates to a power supply system that is capable of powering a plurality of different electronic devices having different power requirements. In another implementation the invention relates to a power supply that can interface with a plurality of different types of mains electrical outlet. A further implementation relates to a power supply system that is capable of powering a plurality of different electronic devices and can interface with a plurality of different types of mains electrical outlet.

BACKGROUND

We have previously disclosed a novel folding plug (see www.themu.co.uk and United Kingdom Patent No. GB2467644) that is greatly reduced in size in comparison to a traditional three-pin plug of the type that may be plugged into mains socket outlets of the type that are common in the United Kingdom.

Whilst this arrangement greatly reduces the size of such plugs, it would be useful if a greater range of devices could be powered by such an arrangement.

It would also be useful if the compact nature of our previously proposed Mu adaptor could be applied to plugs that are configured for plugging into other types of mains electrical socket.

Lastly, it would be particularly useful if a system could be devised that allowed a greater range of devices to be powered, and which provided compact plugs for plugging into other types of mains electrical socket.

The present invention has been devised with the foregoing problems in mind.

SUMMARY

In accordance with a presently preferred embodiment of the present invention, there is provided a power supply system comprising a device part connectable to an electrical device for the supply of electrical power thereto, and a socket part separate from said device part, the socket part being for direct or indirect connection to a mains electrical socket; the device part and the socket part being configured for electrical connection to one another so that electrical power can be transferred from said socket to said electrical device.

In one implementation the socket part is connectable directly to the device part. In another implementation the socket part and the outlet part are connectable to a carrier, electrical power passing from said socket part to said outlet part via said carrier.

In the aforementioned implementations it is preferred for power transfer between said socket part and said device part to occur wirelessly, for example by means of an inductive interface. An advantage of this arrangement is that electrical conductors with the socket and device parts may be buried within the respective parts to reduce the possibility of electrocuting the user.

In another implementation there is provided a power supply system comprising a plurality of device parts with different power output ratings that are each connectable to an electrical device for the supply of electrical power thereto; and a socket part separate from said plurality of device parts, the socket part being for direct or indirect connection to a mains electrical socket; wherein the socket part is electrically connectable to each of the plurality of device parts so that electrical power can be transferred from said socket to said electrical device.

In another implementation there is provided a power supply system comprising a plurality of socket parts, each with a different configuration of electrical pins so that each socket part can be plugged into a particular type of mains socket; and a device part separate from said plurality of socket parts, wherein the device part is electrically connectable to each of the plurality of socket parts so that electrical power can be transferred from said socket to said electrical device.

Other features of arrangements embodying the teachings of the invention, embodiments of the invention, advantages and aims are set out elsewhere in the present application.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
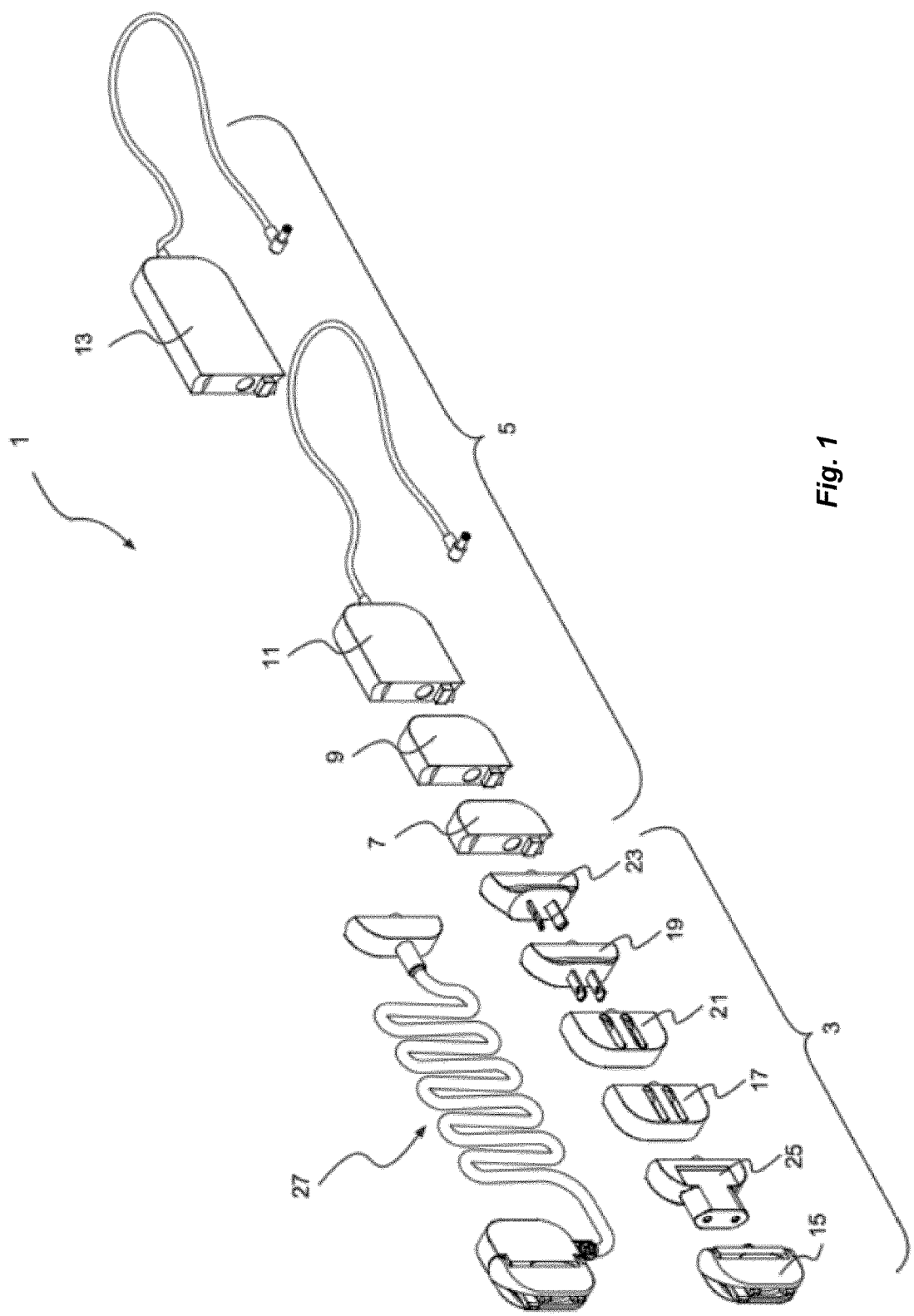
FIG. 1 is a schematic representation of a system embodying the teachings of the present invention.

Referring now to FIG. 1, a system 1 embodying the teachings of the present invention comprises a plurality of socket parts 3 and a plurality of device parts 5. Each of the socket parts 3 is fittable to a said device part 5 for the transfer of electrical power from a mains outlet socket (not shown) to a device (also not shown). In this embodiment each of the socket parts is configured for plugging into a particular type of mains electrical outlet socket.

For example, socket part 15 provides a similar arrangement to that of our previously proposed Mu adaptor (see: wwvv.themu.co.uk and United Kingdom Patent No. GB2467644) and is configured for plugging into mains sockets of the type that are commonly provided in the United Kingdom.

Socket part 17 is compatible with so-called "Type A" mains electrical sockets of the type commonly found in the United States of America, Japan and China. The socket part includes a pair of flat electrical pins that can be rotated through 90 degrees from the position shown where the pins are recessed within the socket part, to a position where the pins project at right angles from a major surface of the socket part.

Socket part 19 is also compatible with so-called "Type A" mains electrical sockets of the type commonly found in the United States of America, Japan and China. In this case, however, the pair of flat electrical pins project from a minor surface of the socket part.

Socket part 21 is similar to socket part 17 in that it includes two pins that can be rotated through 90 degrees to project at right angles from a major surface of the socket part. In this case, however, the pins are inclined towards one another so as to be compatible with so-called "Type I" mains electrical sockets of the type commonly found in Australia and China.

Socket part 23 is similar to socket part 21 in that it includes a pair of electrical pins that are inclined towards one another so that the socket part may be plugged into so-called "Type I" mains electrical sockets of the type commonly found in Australia and China. In this case, however, the pins project from a minor surface of the socket part instead of being rotatable from a position where the pins are recessed in the body of the socket part.

Socket part 25 includes a pair of round electrical pins and can be plugged into so-called "Type C" mains electrical outlets of the type that are commonly found in the European Union, China and Korea. In this instance, the electrical pins project from a housing that can be rotated (from the position depicted) relative to the remainder of the socket part so that the pins project at right angles from a major surface of the socket part.

Socket part 27 functions as a power cord extension and comprises, in this particular instance, a UK-compatible Mu plug at one end of the power cord. In one envisaged implementation socket part 27 may comprise a part that mates to a said device part, and a cable that has a USB connector (any type of USB connector) on the end of it. The USB connector is plugged into a corresponding socket on a Mu plug. In another implementation the socket part may comprise a first part that mates to a said device part 7, 9, 11, 13, a second part that connects to a socket part 15, 17, 19, 21, 23, 25 (in this particular instance a Mu style socket part 15), and an electrical cable interconnecting the first and second parts.

Device part 7 comprises a smartphone adaptor with a USB connector (or other suitable connector) through which it can provide via a USB cable, for example in the region of 5 watts of power to smartphone type electrical devices.

Device part 9 also comprises an adaptor with a USB connector (or other suitable connector), but in this instance it can provide via a USB cable, for example in the region of 10 watts of power to larger smartphone and table computer type electrical devices.

Device part 11 includes an integral power cable, and is configured to provide in the region of 24 watts or power to tablet computer and Netbook type devices. Device part 13 also includes an integral power cable, and is configured to provide in the region of 45 watts of power to laptops and other similar electrical devices.

As will be appreciated by persons of ordinary skill in the art, each of device parts 7 to 13 include a transformer that is configured to step-down mains voltage to an appropriate output voltage. Such arrangements are commonplace in the art and hence will not be further described herein.

The socket parts and device parts described above are configured, in a preferred arrangement, to wirelessly transfer electrical power from one said part to the other. For example, power may be transferred from one part to the other by means of induction. Such systems are again well known in the art and hence will not be further described herein. In a particularly preferred implementation, the socket parts each include a projection that fits within a recess in the device part. The electrical circuitry for implementing inductive power transfer may be buried within the projection.

The socket and device parts may include additional co-operating projections and recesses, and may also or alternatively comprise respective parts of a two-part mechanical interlocking mechanism that allows one said part to be locked to the other before the power supply system is used.

Figure 11:
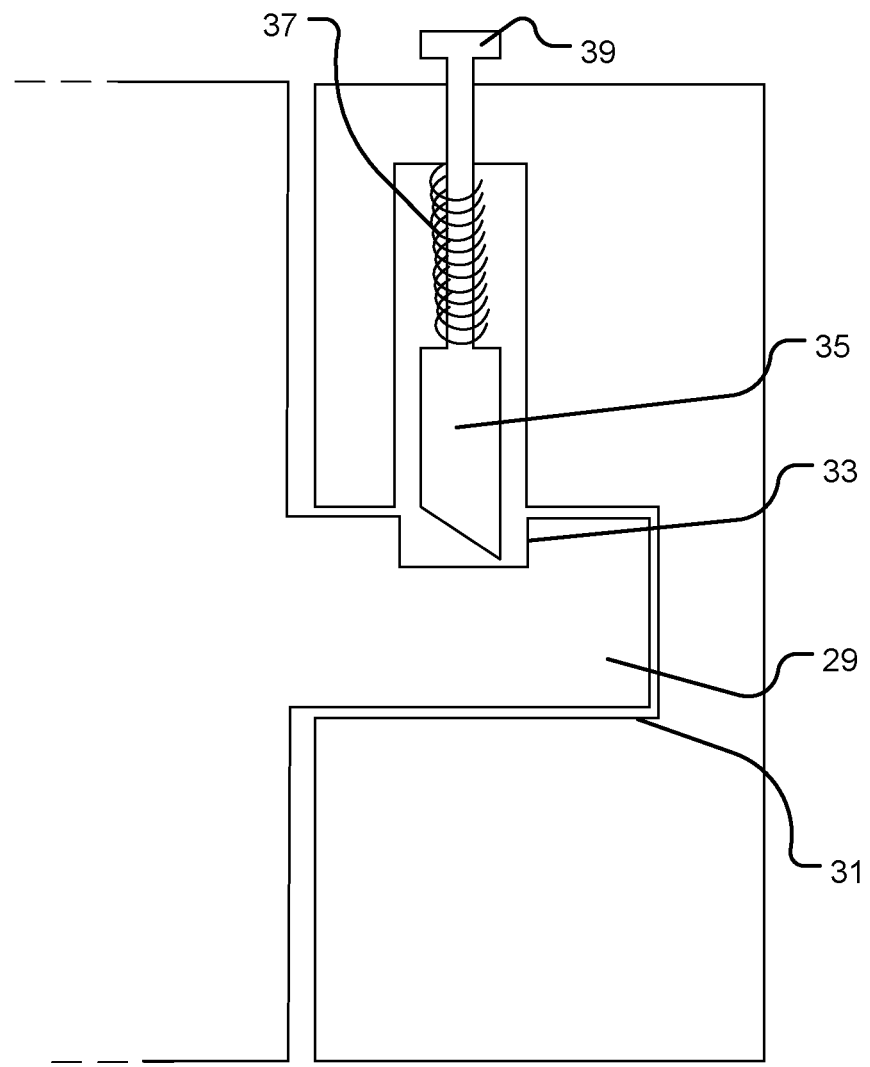
FIG. 11 is a schematic representation of an illustrative locking mechanism.

FIG. 11 is a schematic representation of an illustrative locking mechanism. As shown, a projecting peg 29 from the socket part (in this instance) mates with a depression 31 in the device part (in this instance), and the peg 29 includes a notch 33 into which a resiliently biased catch 35 (in this instance, biased by a spring 37) projects when the peg 29 is pushed into the depression 31. To release the locking mechanism, a user need only pull on a handle part 39 that projects outside of the device part housing to withdraw the catch 35 from the notch 33 and enable the separation of the device and socket parts. In embodiments where the socket part and device part each couple to a carrier, the carrier may be provided with one or more similar locking mechanisms.

In another implementation of the teachings of the invention, there is provided a system comprising one (or more) socket part, and a plurality of device parts. Such a system provides a convenient way for powering many different devices. In another implementation of the teachings of the invention, a system is provided that comprises one (or more) device part and a plurality of socket parts. Such a system provides a compact power supply that can plugged into several different types of mains electrical socket.

In another implementation of the teachings of the invention, the system comprises a single socket part and a single device part. Such a system can be broken down when not in use so that the power supply system is less voluminous.

The remaining figures show, for illustrative purposes only, different combinations of socket parts and device parts.

Figure 2:
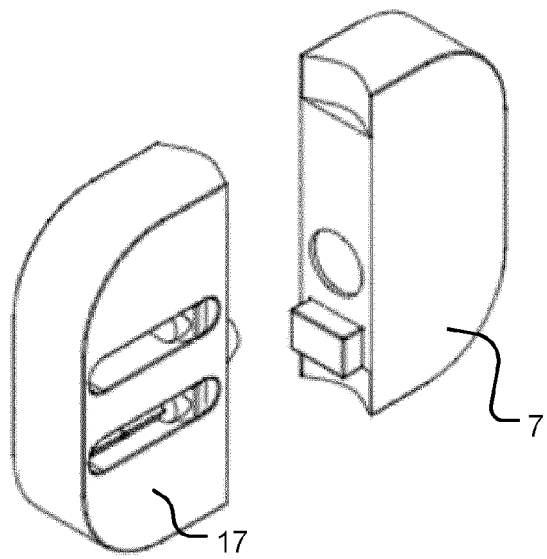
FIGS. 2 to 7 are schematic representations of different socket parts fixed to one particular device part.
Figure 3:
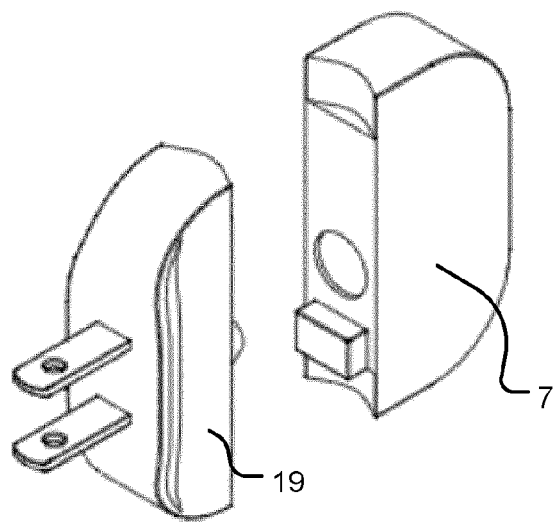
Figure 4:
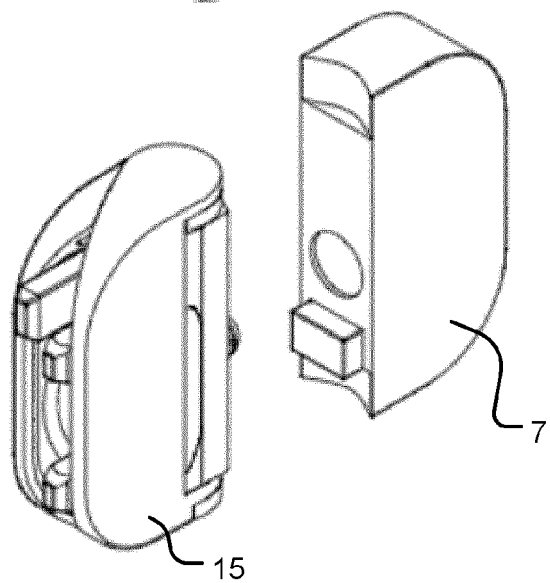
Figure 5:
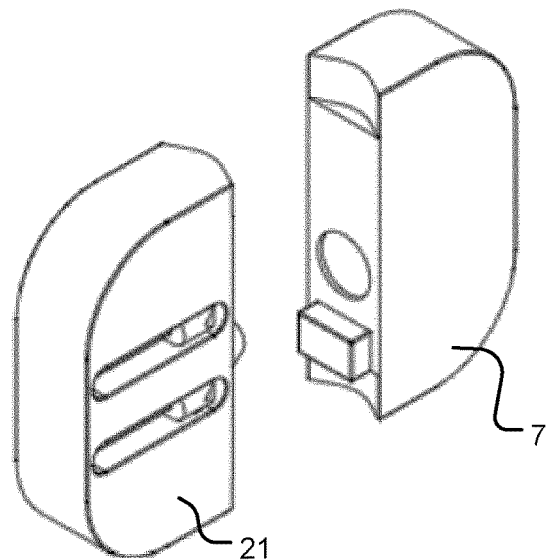
Figure 6:
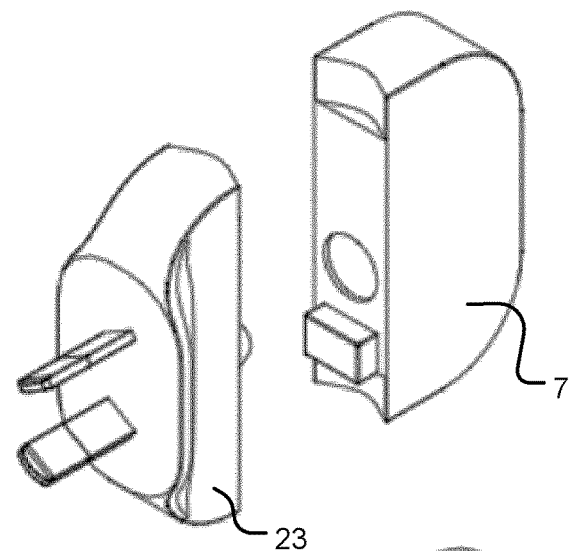
Figure 7:
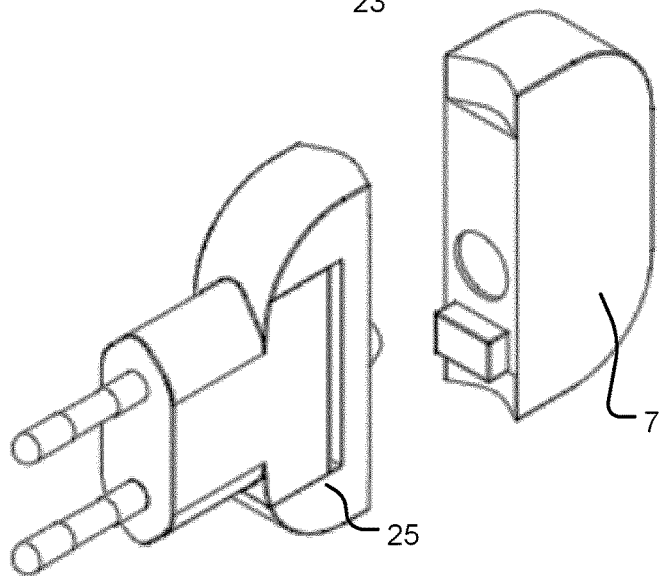

FIG. 2 is a schematic representation of socket part 17 and device part 7. FIG. 3 is a representation of socket part 19 and device part 7. FIG. 4 is a schematic representation of socket part 15 and device part 7. FIG. 5 is a schematic representation of socket part 21 and device part 7. FIG. 6 is a schematic representation of socket part 23 and device part 7, and FIG. 7 is a schematic representation of socket part 25 and device part 7. Clearly visible in FIG. 7 is the fact that the two round pins are mounted in a pin holder that can rotate relative to the remainder of the socket part so that the pins project at right angles from the socket part.

Figure 8:
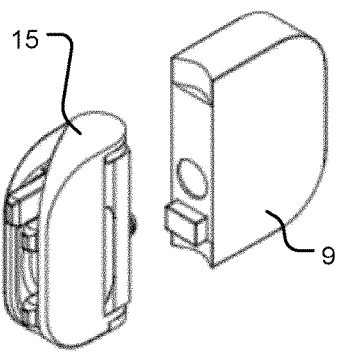
FIGS. 8 to 10 are schematic representations of different device parts fixed to one particular socket part.
Figure 9:
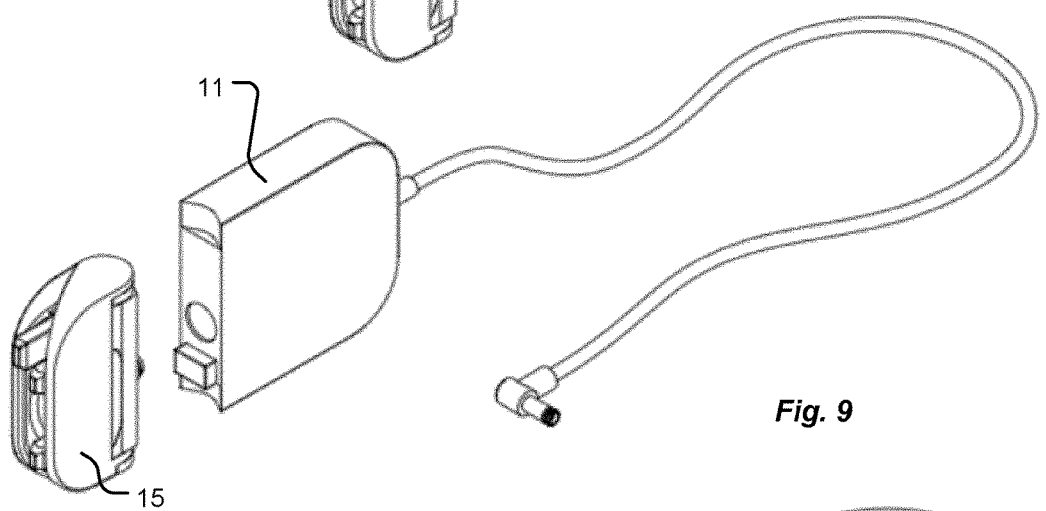
Figure 10:
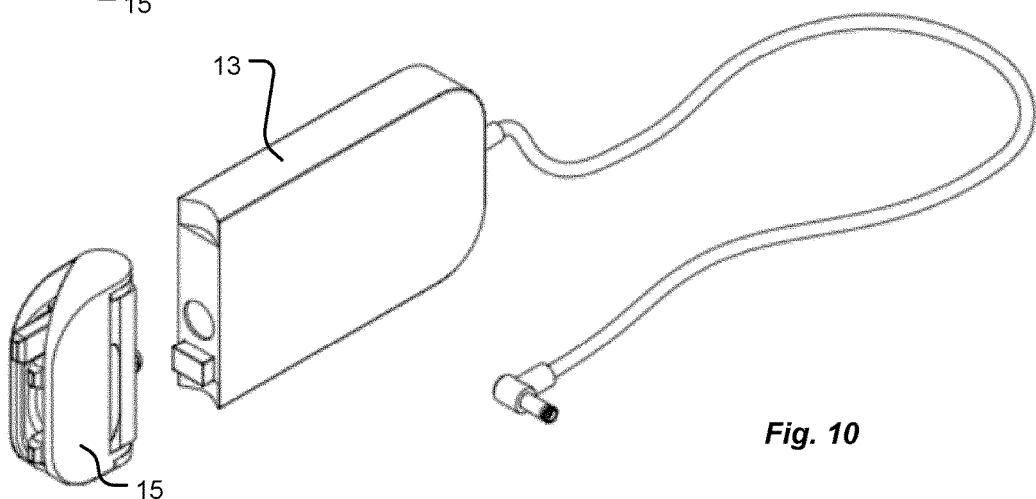

FIG. 8 is a schematic representation of socket part 15 with device part 9 (10 watts). FIG. 9 is a schematic representation of socket part 15 with device part 11 (24 watts), and FIG. 10 is a schematic representation of socket part 15 with device part 13 (45 watts). As will be appreciated, socket part 15 in FIGS. 8 to 10 may be replaced with any of socket parts 17, 19, 21, 23 25 and 27.

As mentioned above, socket part 15 resembles (and functions substantially in the same way as) the Mu plug that is described in more detail in United Kingdom Patent No. 2467644 (the entire contents of which is incorporated herein by reference). Socket part 15 comprises three pins, a longer earth pin, and two shorter pins that connect the plug to the live and neutral mains supply (respectively). The two shorter pins are mounted on an arm that is rotatable between a storage position (shown) where the arm is parallel to the main body of the socket part and the three pins are generally linearly aligned, and an operative position (shown in GB2467644, see FIG. 28 in particular) where the arm is perpendicular (at least substantially) to the main body of the socket part and the three pins are located at respective apexes of a triangle (i.e. so that the pins are configured for plugging into a UK style electrical plug).

First and second wings are pivotally mounted to the device part main body, and (at least substantially) cover the three pins when they lie parallel to the device part main body (as shown in FIGS. 8 to 10). In this position the wings are in their storage position. To move the arm from the aforementioned storage position to the operative position, the wings must first be pivoted to their operative position, namely a position (depicted in FIG. 28 of GB2467644) where they extend roughly perpendicularly from the main body of the device part. Once the wings have been pivoted to their operative position, the arm can be pivoted to its operative position and the socket part can now be plugged into a socket. Advantageously, the wings cannot be pivoted further away from the pins than their operative position, and thus obstruct access to the pins of the socket part when the socket part is plugged into a socket.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst device parts with particular voltages have been described above, it will be appreciated that the device parts can be configured to provide any desired output voltage. Similarly, whilst the socket part is described as having a projection that mates with a corresponding depression in the device part, it will be appreciated that the projection could be on the device part and the corresponding depression in the socket part.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6.

The invention claimed is:

1. A power supply system for connecting an electrical appliance to any of a plurality of electrical mains sockets for the supply of electrical power from said electrical mains socket to the electrical appliance, each said socket having a different configuration of electrical contacts, the power supply system comprising:
   a device part having an electrical outlet configured to receive a first electrical connector of a power cable that has a second connector, said second connector being connectable to an electrical appliance for the supply of electrical power from the device part to said electrical appliance, and
   a plurality of socket parts that are each separate from said device part, each said socket part including a plurality of electrical pins that are configured for direct connection to a particular one of said plurality of mains electrical sockets;
   wherein the device part is releasably connectable directly to any of said socket parts so that electrical power can be transferred from said mains electrical socket to said electrical device; and a first socket part of said plurality of socket parts comprises an earth pin, a live pin and a neutral pin; the live and neutral pins being carried by a rotatable arm; said rotatable arm being moveable from a storage position where the arm is generally parallel to a main body of the socket part and an operative position where the arm is generally perpendicular to the main body of the socket part.

2. A system according to claim 1, comprising a releasable locking mechanism configured to lock the device and socket parts together when the device part is connected to the socket part.

3. A system according to claim 1, wherein said first socket part further comprises a pair of wings pivotally coupled to said socket part main body, said wings being pivotable between a storage position where the wings extend from either side of said socket part main body to lie generally in parallel therewith, and an operative position where the wings extend generally perpendicularly to the socket part main body.

4. A system according to claim 3, wherein the wings at least partly cover the pins when the arm and the wings are in their respective storage positions.

5. A system according to claim 4, wherein the arm cannot be moved to the operative position before the wings have been moved to their operative position.

6. A system according to claim 5, wherein the wings cannot be moved to their storage position before the arm has been moved to its storage position.

7. A system according to claim 6, wherein the wings function to obstruct access to the pins when the arm and wings are in their operative positions, and the socket part is plugged into a socket.

\* \* \* \* \*